(12) United States Patent
Bäck et al.

(10) Patent No.: US 8,477,714 B2
(45) Date of Patent: Jul. 2, 2013

(54) COMMUNICATION SYSTEM COMPRISING A PLURALITY OF COMMUNICATION NETWORKS

(75) Inventors: Juha Bäck, Helsinki (FI); Tony Hulkkonen, Vantaa (FI)

(73) Assignee: Nokia Corporation, Espoo (FI)

( * ) Notice: Subject to any disclaimer, the term of this patent is extended or adjusted under 35 U.S.C. 154(b) by 2661 days.

(21) Appl. No.: 10/468,443

(22) PCT Filed: Feb. 15, 2002

(86) PCT No.: PCT/IB02/01398
§ 371 (c)(1),
(2), (4) Date: Aug. 20, 2003

(87) PCT Pub. No.: WO02/067617
PCT Pub. Date: Aug. 29, 2002

(65) Prior Publication Data
US 2004/0156329 A1    Aug. 12, 2004

(30) Foreign Application Priority Data
Feb. 21, 2001    (GB) .................................. 0104281.1

(51) Int. Cl.
*H04W 4/00*    (2009.01)
(52) U.S. Cl.
USPC ........... 370/331; 370/338; 370/395; 370/401; 455/432.2; 455/432.3; 455/435.1; 455/437; 455/438; 455/439; 455/440; 455/442; 455/443

(58) Field of Classification Search
USPC ......................................... 370/328, 329, 331
See application file for complete search history.

(56) References Cited

U.S. PATENT DOCUMENTS

| | | | |
|---|---|---|---|
| 5,812,756 A | 9/1998 | Taylor | |
| 6,081,518 A | 6/2000 | Bowman-Amuah | |
| 6,363,144 B1 | 3/2002 | Becher et al. | |
| 6,650,899 B1 * | 11/2003 | Stumpert | 455/436 |
| 2001/0017850 A1 * | 8/2001 | Kalliokulju et al. | 370/331 |
| 2001/0028641 A1 * | 10/2001 | Becher et al. | 370/352 |
| 2002/0068565 A1 * | 6/2002 | Purnadi et al. | 455/436 |

FOREIGN PATENT DOCUMENTS

| | | |
|---|---|---|
| EP | 0 898 438 | 2/1999 |
| EP | 1 011 274 | 6/2000 |
| EP | 1 058 471 | 12/2000 |
| JP | 2000-358267 | 12/2000 |
| WO | WO 00/60895 | 10/2000 |
| WO | WO 00/70831 | 11/2000 |
| WO | WO 01/11911 A1 | 2/2001 |

* cited by examiner

*Primary Examiner* — Alvin Zhu
(74) *Attorney, Agent, or Firm* — Squire Sanders (US) LLP (57) ABSTRACT

A communication system and a method for the same is disclosed. In the method a first type of communication services is provided for a station (1), wherein a first network entity (3) provides control operations for the provision of the communication service. A part of said control operations is then relayed from the first network entity (3) to a second network entity (4). Information is exchanged between the first and second network entities, said information associating with provision of a second type of communication services for the station. A communication service of said second type is provided for the station based on said information.

37 Claims, 7 Drawing Sheets

COMMUNICATION SYSTEM COMPRISING A PLURALITY OF COMMUNICATION NETWORKS

FIELD OF THE INVENTION

The present invention relates to a communication system, and in particular, but not exclusively, to a communication system comprising a plurality of communication networks.

BACKGROUND OF THE INVENTION

A communication network typically operates in accordance with a given standard or specification which sets out what the various elements of the network are permitted to do and how that should be achieved, i.e. the technology on which the communication is based on in the network. The standard may define whether a user of the network or more precisely, a user equipment is provided with a circuit switched service and/or a packet switched service. The standard may also define the communication protocols which shall be used for the connection. One or more of parameters requires for a communication session in the network are also typically defined.

In other words, the standard defines the "rules" and parameters on which the communication within the communication system is based on. Examples of the different standards and/or specifications include, without limiting to these, specifications such as GSM (Global System for Mobile communications) or various GSM based systems (such as GPRS: General Packet Radio Service), EDGE (Enhanced Data rate for GSM Evolution), AMPS (American Mobile Phone System), DAMPS (Digital AMPS), or $3^{rd}$ generation (3G) communication systems such as the Universal Mobile Telecommunication System (UMTS), IMT 2000 (International Mobile Telecommunication System 2000), i-phone and so on.

User equipment that is to be used for communication via a communication network has to be designed to be compatible with the "rules" of the network. A user equipment may also be arranged to be compatible with more than one technology, i.e. a user equipment may communicate in accordance with different types of communication services. Such user equipment are often called as multi-mode terminals. The basic example of the multi-mode terminals is a dual-mode mobile station arranged to be compatible with two different communication networks.

A communication network is a cellular radio network consisting of accessing entities referred to as cells, hence the name "cellular system". In most cases the cell can be defined as a certain area covered by at least one base transceiver station (BTS) that serves user equipment (UE) within the cell.

The user equipment (UE) within one of the access entities may be controlled by one or several control entities. Examples of the control entities include radio network controllers such as a base station controller (BSC) of the GSM system and a radio network controller (RNC) of the $3^{rd}$ generation systems. An access network controller is in communication with appropriate core network (CN) control entities. The core network entities may comprise control nodes such as a mobile switching center (MSC), a serving GPRS support node (SGSN) and various gateway nodes such as a gateway GPRS support node (GGSN) or gateway mobile switching center (GMSC). The above list of the control entities is by no means exhaustive and other entities may also be implemented in the network. The network entities may also include nodes for storing information that associates with user equipment subscribing the network or visiting the network, such as appropriate home location registers (HLR) and visitor location registers (VLR). Depending the implementation, a register node may be integrated with another network entity.

A cellular system provides mobility for the user equipment in communication over a wireless interface with the network system. The user equipment is enabled to change from an access entity to another access entity. The change in the access entity may occur e.g. when a user equipment moves i.e. roams from a cell to another cell. The user equipment may change even from a network system to another network system, as long as the user equipment is compatible with the standard of said other system.

In order to be able to provide the mobility for user equipment with an ongoing (active) connection, the communication system may be adapted to hand the connection over from a serving control entity to another control entity. The handover of the connection may also be required for other reasons. For example, the quality of a packet switched connection may drop below a predefined threshold level, the access entity may become too congested, the user wishes to change the type or provider of a communication service and so on.

The handover should also be possible between two entities that belong to different network systems. If the new cell is not served by a similar system as the previous cell, then handover needs to be accomplished between communication systems that are based on different communication technologies and "rules".

When a handover is to be accomplished between nodes of different communications systems (i.e. systems that are based on different communication technologies), it is possible that the "new" connection cannot be properly set-up due to differences in the operation of the various elements of the "new" (i.e. target) and the "old" communication systems.

Figure 1:
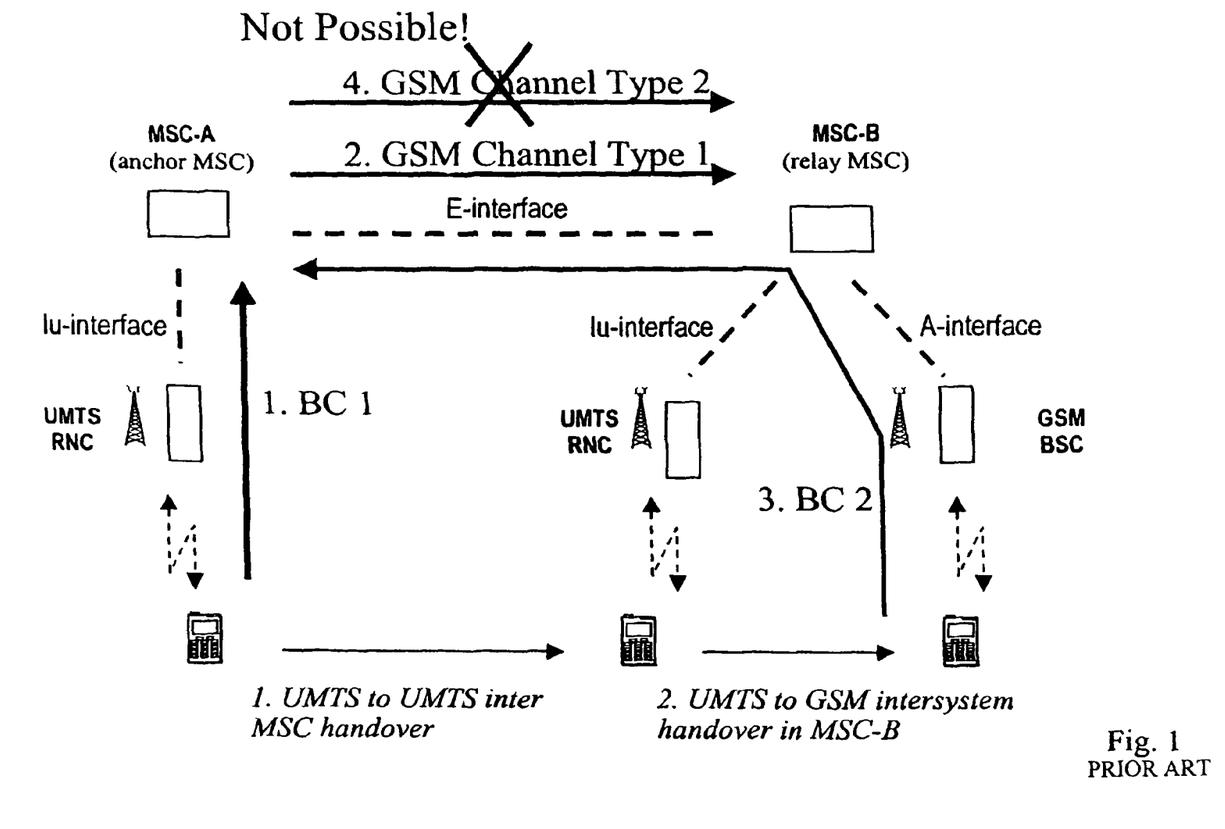
FIG. 1 shows a prior art communication system arrangement comprising two different services.

FIG. 1 illustrates an example of the limitations of the prior art systems. More particularly, the example relates to a communication system wherein a user equipment may have a GSM and a UMTS session. The term "session" refers to any type of communication the user equipment may have, such as to a speech call, data call (e.g. web browsing) an so on.

A user can put an existing call or other communication session on hold and establish another session. A hold type service allows a server user equipment to interrupt communication on an existing active session and then subsequently, if desired, to re-establish the session. The traffic channel remains assigned to the user equipment after the communication is interrupted to allow the origination or possible termination of other communication sessions.

A service feature called "Support for Dual Services" is also known. This service feature enables two users on a point-to-point connection to use the connection for different types of information transfers during a single session but not at the same time. That is, a session may continue despite a change in the type of the communication. Examples of this type of services include supplementary services in which speech communication may be followed by data communication and speech and unrestricted data may alternate with each other.

Services such as intermediate calls and dual services may in some instances require a change in the channel configuration. However, the changing of the channel configuration may not be supported in a similar manner in two different networks, or one of the networks may not support any configuration changing mechanism.

If a negotiation during call establishment leads to recognition of this kind of services, an in-call modification procedure is allowed to be executed within the current call session by changing from one call mode to another. The in-call modification procedure, however, may require changes in the channel configuration while keeping the previously allocated channel. The required change may comprise allocation of a new channel, change in channel configuration parameters and so on.

The inventors have found that a handover between the different communication services may restrict the availability of this type of service features. For example, the above referenced services cannot be supported in a communication system comprising GSM and UMTS networks because the different network entities cannot always provide each other with information necessary to enable such a change. Furthermore, if a service feature such as the dual services is used or an intermediate call is established before a handover, this may prevent a successful intersystem handover to take place after the provided service has been modified.

In the FIG. 1 UMTS/GSM example the problem arises after a UMTS to GSM handover in a control entity that acts as a relay control entity (MSC-B). Such a handover is anticipated to occur substantially frequently. This is due, for example, the restricted coverage provided by the UMTS service. An operator may also wish to control the type of radio technology that is used to provide a particular service (e.g. speech or fax service). The operators may also wish to control any service provided for a particular class of users, e.g. the services provided for visiting subscribers from other national networks or second generation (2G) subscribers.

More particularly, the following procedures may take place in a FIG. 1 type arrangement.

At a session setup phase in the UMTS the user equipment sends a bearer capability (BC. 1) information element (IE) to the network. Based on the information within the bearer capability element, a serving MSC (MSC-A) derives UMTS quality of service (QoS) parameters that are needed for the radio bearer establishment. The bearer capability information element parameters can be mapped to Quality of Service (QoS) Radio Access Bearer (RAB) parameters during the session setup. The skilled person is familiar with the mapping operation. More information about the mapping can be found e.g. from 3GPP (third generation partnership project) technical specifications Nos. TS 23.107 and TS 23.910.

A UMTS to UMTS inter MSC (i.e. intrasystem) handover may be accomplished such that the serving i.e. anchor control entity (MSC-A) sends UMTS QoS parameters to the target i.e. relay control entity (MSC-B). After a UMTS to UMTS inter MSC intrasystem handover, Radio Access Network Application Part (RANAP) can be used as the access network protocol for signalling over an interface between the two control entities (MSC-A and MSC-B).

If a core network (CN) function of the UMTS needs to perform a handover towards the GSM service (UMTS to GSM handover), the relay control entity (MSC-B) performs an intersystem handover to the GSM by using GSM traffic channel parameters provided to it by the anchor entity (MSC-A).

The user may wish put the ongoing call on hold and establish a data call. In the call setup the user equipment sends the Bearer Capability (BC) describing the service to the anchor control entity (MSC-A) transparently via the relay control entity (MSC-B). Anchor MSC may then proceed an analysis whether the user is authorised to get that particular service and so on. The anchor MSC initiates assignment procedure towards the relay control entity (MSC-B) and the serving GSM BSS.

However, the relay control entity can only be aware of those channel parameters that associate with the active call. The parameter for the second call may be different from the parameters of the active call.

The inventors have found that this may be problematic. If the user puts at this point the ongoing session on hold and establishes a new session which requires a change of channel configuration by allocating a new channel, the session establishment will fail in the prior art arrangement since the description of the new channel is not known by the relay control entity (MSC-B). More particularly, the call establishment will fail in the FIG. 1 arrangement since the GSM Channel Type information element that associates with the intermediate data call and that is required for traffic channel assignment can not be sent to the target controller over an E-interface between the controllers. The call establishment fails also for the same reason in the case of dual services or other services wherein in-call modification is required. For example, this may occur when a speech service is followed by a data service.

SUMMARY OF THE INVENTION

Embodiments of the present invention aim to address one or several of the above problems.

According to one aspect of the present invention, there is provided a method in a communication system, the method comprising:

providing a first type of communication services for a station, wherein a first network entity provides control operations for the provision of said communication services in a first radio access system;

relaying a part of said control operations from the first network entity to a second network entity, the second network providing control operations for provision of communication services in a second radio access system, the first and second radio access systems providing said first type of communication services;

exchanging between the first and second network entities information that associates with the provision of a second type of communication services, the second network entity being also for provision of control operations for provision of communication services in a third radio access system; and providing, based on said information, said second type of communication services for the station in the third radio access system.

According to another aspect of the present invention there is provided a method in a communication system, the method comprising:

initiating provision of a communication service for a station by transmitting a request for the communication service from an access entity to a relay network entity;

signalling a request for access processing from the relay network entity to an anchor network entity;

exchanging between the relay and anchor network entities information that associates with provision of the requested communication services by means of the access entity; and providing the requested communication service for the station based on said information.

According to another aspect of the present invention there is provided a communication system comprising:

first and second communication means for providing a first type of bearers for a station;

third communication means for providing a second type of bearers for the station;

a first network entity for controlling the first communication means;

a second network entity for controlling the second and third communication means, wherein a part of the control functions by the first network entity that associate with the provision of the first type of bearers can be relayed to the second network entity; and interface means between the first and second entities for exchange of information that associates with provision of the second type of bearers for the station, whereby the third communication means are adapted to provide said second type of bearers for the station based on said information.

The embodiments of the invention enable provision of information between network entities regarding communication channels in different communication networks. The information may describe characteristics of an active session in such a way that a new controller entity can derive the of session from the information.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 2:
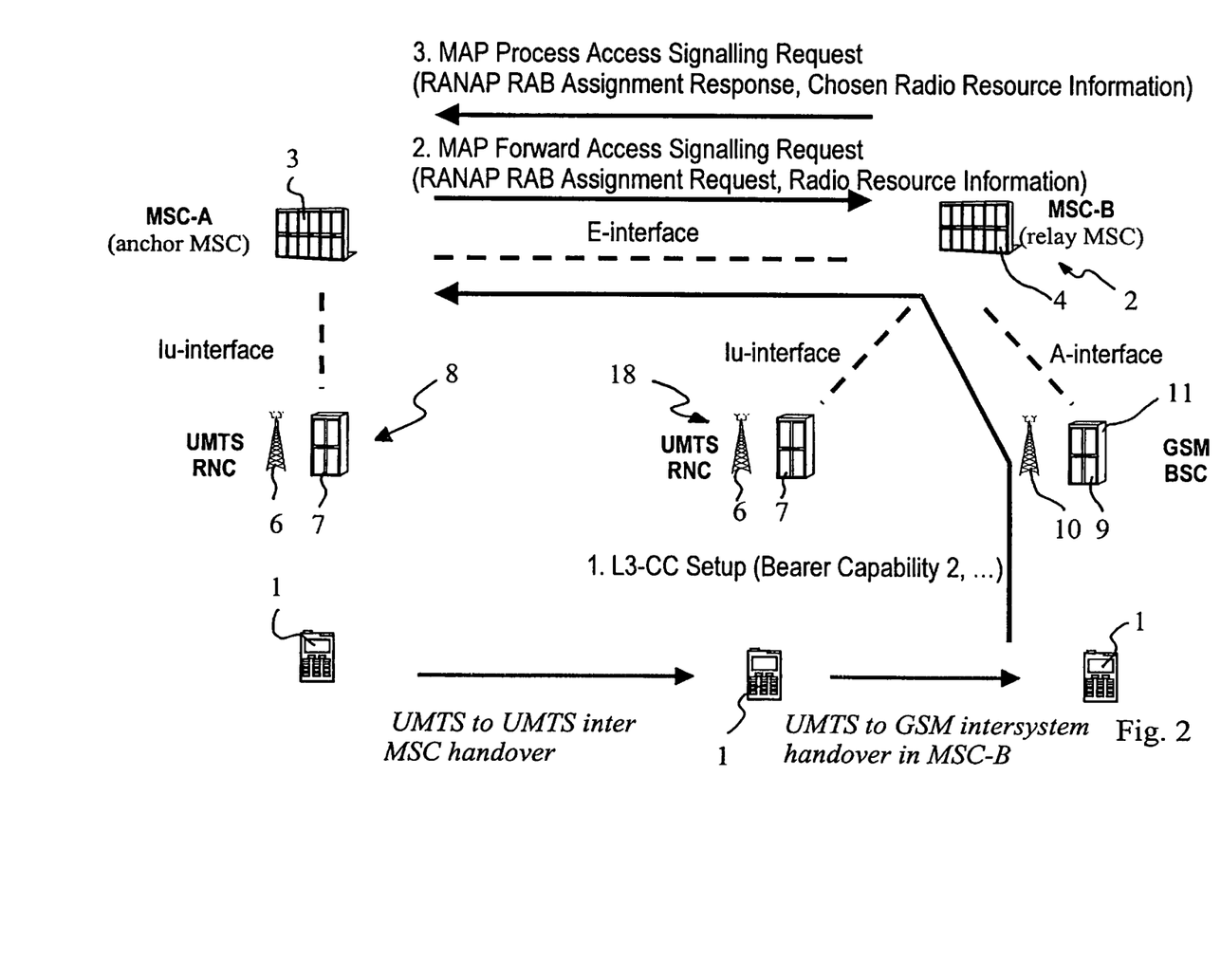
FIG. 2 shows an embodiment of the present invention.

Reference is made to FIG. 2 which illustrates a communication system for the provision of communication services for mobile user equipment. The user equipment comprises a mobile station (MS) 1 that may be in wireless communication with a plurality of base (transceiver) stations (BTS) of the communication system. Each base station 6, 10 has a radio transceiver capable of transmitting radio signals in downlink to the mobile stations and receiving radio signals in uplink from the mobile station 1. Thus a base station can communicate with a mobile station (MS) which itself includes a radio transceiver.

The communication system of FIG. 2 includes elements of a UMTS and a GSM network. The illustrated system shall be understood to comprise a core network (CN) part 2, a UMTS terrestrial radio access network (UTRAN) part 8, 18 and a GSM radio access network part 9. The elements and interfaces between the elements and of the system will be described in more detail below. The core network (CN) part 2 can be connected to external networks (not shown).

FIG. 2 shows two core network control entities, that is two Mobile Services Switching Centres (MSC-A, MSC-B) 3,4. In the FIG. 2 situation the control entity 3 can be seen to constitute an anchor control entity for the mobile station 1. This means that the control of the communication session the mobile station 1 has been "anchored" to this controller. The control entity 3 controls the call and the mobility management of the Mobile during the call, that is before, during and after a basic or subsequent handover. When procedures that relate to dedicated resources (e.g. BSSAP/RANAP procedures) have to be performed towards the mobile station 1, these procedures may be initiated and driven by the control entity 3 (MSC-A). The non-access stratum signaling (typically call control and mobility management) is relayed transparently by the second control entity 4 (MSC-B) between the control entity 3 (MSC-A) and the mobile station 1.

In an Intra-MSC handover the second control entity 4 (MSC-B) may keep the control of the whole Intra-MSC handover procedure. In an Inter-MSC handover case, the role of control entity 4 (MSC-B) may only be to provide control of the radio resources within its area. This means that the relay control entity 4 (MSC-B) keeps control of the connection and release of the radio resources towards the GSM base station controller 11 or UMTS radio network controller 7 under its own area.

The network control entities 3 and 4 may communicate with each other. An interface referred to as an E-interface has been provided between the control entities for transportation of signalling traffic.

Although not shown for clarity reasons, a mobile switching centre may comprise a register for subscriber related information such as a Visitor Location Register (VLR). The MSC control entity 4 of FIG. 2 is designed to support both UMTS and GSM based connections. The MSC control entity 3 of FIG. 2 supports at last UMTS based connections. The control entity 3 may also support GSM based connections, although it is not necessary.

Three radio access network subsystems 8, 18 and 9 are also shown. More particularly, FIG. 1 shows two UMTS radio network systems (RNS) 8 and 18. A UMTS radio access network (UTRAN) is typically composed of one or more radio network subsystems. Each radio network subsystem is composed of a radio network controller (RNC) 7 and one or more base stations (BTS) 6.

In the UMTS the signalling protocol between a UTRAN access network and the core network (CN) is the RANAP. The RANAP is specified in detail in the 3GPP specification No. TS 25.413. The functions of RANAP are e.g. radio resource management (e.g. setup, modify, release of a session) and relocation of serving radio network controller function from one radio network controller to another radio network controller.

A GSM radio access network 9 may also be composed of more than one base station subsystem (BSS: not shown). Each base station subsystem is composed of a base station controller (BSC) 11 and one or more base stations (BTS) 10. The signalling protocol between a GSM radio access network and core network (CN) is typically based on the base station subsystem application part (BSSAP). The base station subsystem application part (BSSAP) is specified in more detail in the 3GPP specification No. TS 48.008. The BSSAP supports all of the procedures between the core network and the base station subsystem that require interpretation and processing of information that relates e.g. to single calls and resource management.

It shall be understood that the two communication networks may overlap. That is, an area may be covered with radio access networks of both communication systems.

The base stations of the UMTS radio access network are often called to as node B. The operation of the Node B and the base station BTS may logically correspond to each other. It should also be appreciated that the functions of a GSM base station BTS and a UMTS Node B may also be implemented by means of one entity, i.e. that a base transceiver station may serve both the GSM system and the UMTS system.

The mobile stations may be provided with a bearer via the Node B 6 of the UMTS access network 8 or 18 or via the base station 10 of the GSM access network 9.

The stations 6 and 10 are shown to be controlled by respective radio network controller nodes 7 and 11. The arrangement is such that the radio network controllers are in turn controlled by the network entities 3 an 4.

The base station subsystem (BSS) 9 of the GSM network comprises a base station controller (BSC) 11 for controlling the base station 10. The RNC 7 of the UMTS radio access network 8 and the base station controller BSC 11 of the GSM access network 9 may logically correspond to each other.

Each radio network controller is responsible for the control of the radio resources of the base station. The radio network controller interfaces the core network (CN) 2 and also terminates the radio resource control (RRC) protocol in the UMTS and radio resource protocol (RR) in the GSM. The radio resource control (RRC) protocol defines the messages and procedures between the user equipment and the access network. It should be appreciated that other control nodes may also be used for the implementation of the radio network control function.

The interface between the control entities of the core network 2 and the UMTS radio access networks 8 and 18 may be provided over a so called Iu interface. The GSM BSS 9 may interface the control entity MSC-B 4 over a A-interface. The A-interface provides the circuit switched connection of the GSM system. Other interfaces between the radio access networks and the core network may also be provided, but these are not necessary for understanding the invention and are thus not shown or explained in detail.

During a radio connection between the mobile user equipment or station 1 and the appropriate radio station, the mobile station may have a connection with the respective control entity either via the GSM base station 10 or the UMTS Node B 6.

If the mobile station is to be relocated from a access entity ("old access entity") to another access entity ("new access entity") or another communication session is to be established for the mobile station the radio channels of the mobile station may need to be modified. The radio channels may need to be changed such that the mobile station may communicate with the radio station and associated network apparatus of the new access entity as it would do with the radio station and associated network apparatus of the old access entity.

It is possible that the radio channels of the new access entity cannot support all features that were provided for the user during the session via the old access entity, or that the new radio channels are defined based on different parameters. The embodiments of the invention will address a situation where radio channels need to be established in two different access entities.

More particularly, an in-call modification procedure may be needed in order to provide adequate support for services such as the dual services discussed above. The in-call modification procedure makes it necessary is some occasions to change the channel configuration. This is preferably done by allocating a new channel for the call.

FIG. 2 shows a UMTS to UMTS inter MSC handover wherein the mobile station 1 is relocated from access network 8 to access network 18. During this operation a serving i.e. anchor control entity (MSC-A) 3 sends UMTS quality of service (QoS) parameters to the relay control entity 4. The quality of service parameters associate with the radio channels provided for the mobile station 1 via the old access entity 8.

In the UMTS radio access network the radio channels may be characterised or differentiated based on said quality of service (QoS) parameters. However, in the GSM the radio channels are differentiated based on channel type parameters. The channel type parameter describes the characteristics of the required radio channel. The required characteristic may comprise features such as: speech/data/signalling; full rate/half rate/enhanced full rate; number of traffic channels; transparent/non-transparent data; data rate; and so on.

In order to be able to establish a radio channel in the GSM system the responsible control entity needs to know the channel type. To enable the relay control entity to perform a UMTS to GSM handover, the anchor control entity (MSC-A) should be able to inform the relay control entity (MSC-B) of the GSM channel type.

This information may be included in parameters that describe the characteristics of the ongoing call in a way that the GSM Base Station Subsystem (BSS) can understand requirements of the connection. To enable this the anchor control entity 3 may send also to the target i.e. relay control entity (MSC-B) 4 information regarding the channel type a GSM control entity shall provide. This information may be used later on if the connection is handed over to the GSM service by the relay control entity 4.

In a more particular embodiment described with reference to FIG. 2 a new information parameter is introduced into a message that is transmitted between the control entities 3 and 4. The parameter contains information associated with the radio resources of the GSM access entity 9. Hence the parameter will be referred to in the following as a radio resource information (RRI) parameter.

The radio resource information parameter may be generated by the anchor control entity 3 based on the bearer capability send by the user equipment 1. The radio resource information parameter may contain a GSM channel type information element describing the characteristics of the intermediate call. If dual services are used, the parameter may describe the second session as was described by a second bearer capability.

A possible information element for this purpose has been specified in more detail e.g. in 3GPP specification TS 48.008.

The radio resource information parameter can be inserted into a protocol message, such as into a mobile application part (MAP) message. For example, the radio resource information parameter is shown to be inserted into a MAP FORWARD ACCESS SIGNALLING Request message.

It shall be appreciated that the MAP FORWARD ACCESS SIGNALLING Request message does not relate to handover proceedings as such and that the protocol message carrying the radio resource information element does not need to associate with handover proceedings.

The radio resource information parameter can be included e.g. in a message including a RANAP message. For example, if Radio Access Network Application Part (RANAP) protocol is used for the UMTS radio access network the anchor entity 3 may include the radio resource information element to messages including an encapsulated RANAP message 'RAB ASSIGNMENT REQUEST'. In FIG. 2 this is shown by message step 2 wherein a MAP FORWARD ACCESS SIGNALLING Request is shown to be transported from the anchor control entity 3 to the relay control entity 4.

The user equipment 1 may initiate the proceedings to obtain a second session by sending a bearer capability (BC) information element (IE) to the network after putting the first call on hold. The first call was established e.g. based on the bearer capability 1 as shown in FIG. 1. The BC element describes the intermediate service requested by the user equipment.

The anchor control entity 3 derives the UMTS QoS parameters and the GSM Channel Type parameter from the received Bearer Capability (BC 2 in FIG. 2). For the radio resource assignment, the anchor control entity 3 sends the UMTS QoS parameters in a radio access bearer (RAB) Assignment Request and GSM Channel Type information element (IE) at the mobile application part (MAP) level of the layered function model.

The information element is included in the Radio Resource Information parameter. The relay control entity 4 extracts the GSM Channel Type information element from the Radio Resource Information parameter and sends the channel type information further to the GSM base station subsystem BSS 9 in a base station subsystem application part (BSSAP) assignment request or handover request message.

The base station subsystem receives the channel type information and in response thereto selects a radio channel (or several channels). However, since the anchor entity 3 may not be aware of the capabilities of the base station subsystem 9, the channel type information provided to the base station subsystem may only be indicative and the base station subsystem may need to be provided with the freedom to choose a radio channel that best matches the information and the available resources.

After the radio channel assignment the GSM base station subsystem 9 may sends information about the selected radio channel to the relay control entity 4. The information may be signalled in a message such as the base station subsystem application part (BSSAP) assignment response or handover request acknowledge. The relay control entity 4 forwards then the chosen channel information element describing the characteristics of the selected channel for the second call to the anchor control entity 3. This may be accomplished by means of a chosen radio resource information element encapsulated in a MAP PROCESS ACCESS SIGNALLING Request. The anchor entity may use this information in procedures such as charging processing. If the session comprises a data call the anchor entity may use this information for adapting the interworking function to cope with a new channel type.

Figure 3:
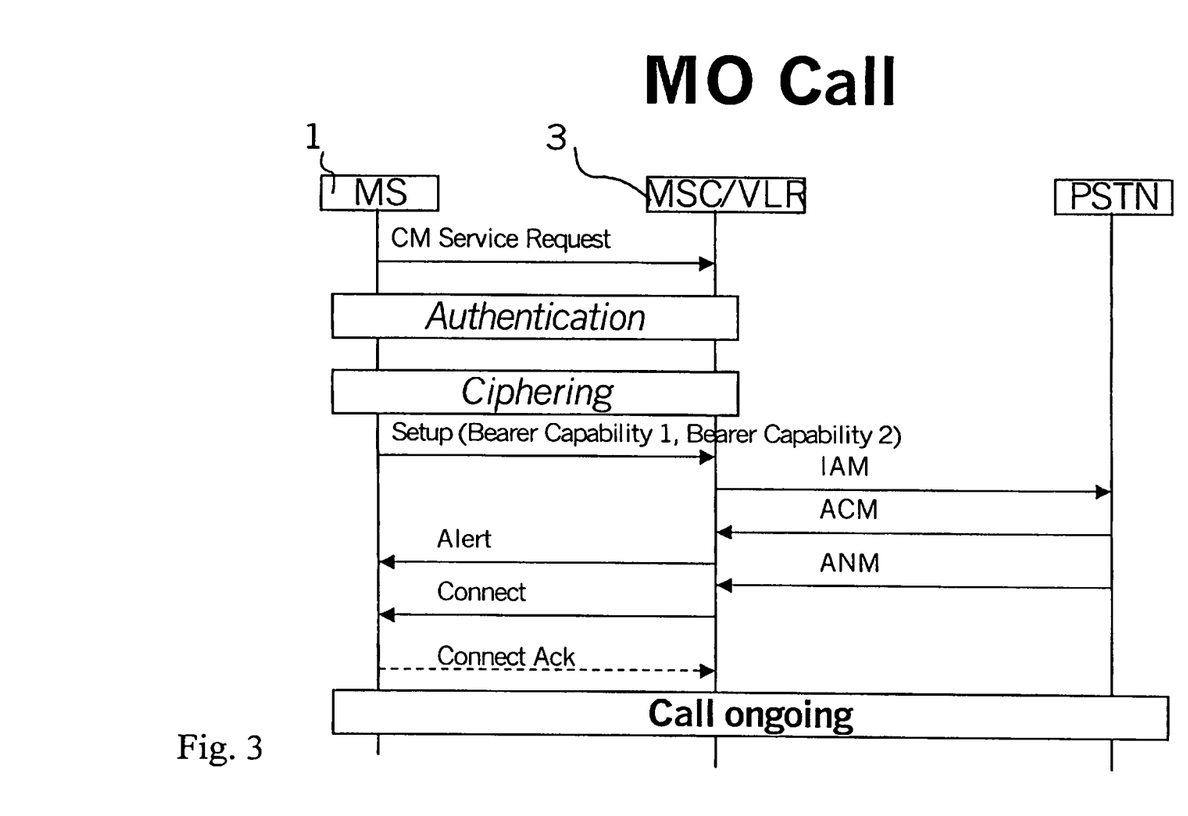
FIGS. 3 to 5 show signalling diagrams for different situations that may occur in a communication system.

FIG. 3 is a signalling flow chart illustrating a basic mobile station originated call session establishment procedure in a case where dual services are provided. The call session establishment procedure is initiated by a service request to a serving control entity 3. Authentication and ciphering processes may follow. These operations are known by the skilled person and will thus not be explained in more detail.

During setup signalling the mobile station 1 transmits information regarding bearer capability 1 and bearer capability 2. By means of this the mobile station 1 informs the network that it intends to establish another communication session during the first session. That is, bearer capability 1 is for a first call session initiated during the call connection establishment procedures and bearer capability 2 is for a second session, such as for a data call to be established during the first session.

FIG. 3 illustrates signalling for a case where the first session is to be terminated at another network such as a public switched telephone network (PSTN). A normal signalling necessary for the session establishment may be performed between the controller entity 3 and entities of the other network. After alert and connection signalling the first active call session with a channel allocation and configuration is provided for the mobile station 1.

Figure 4:
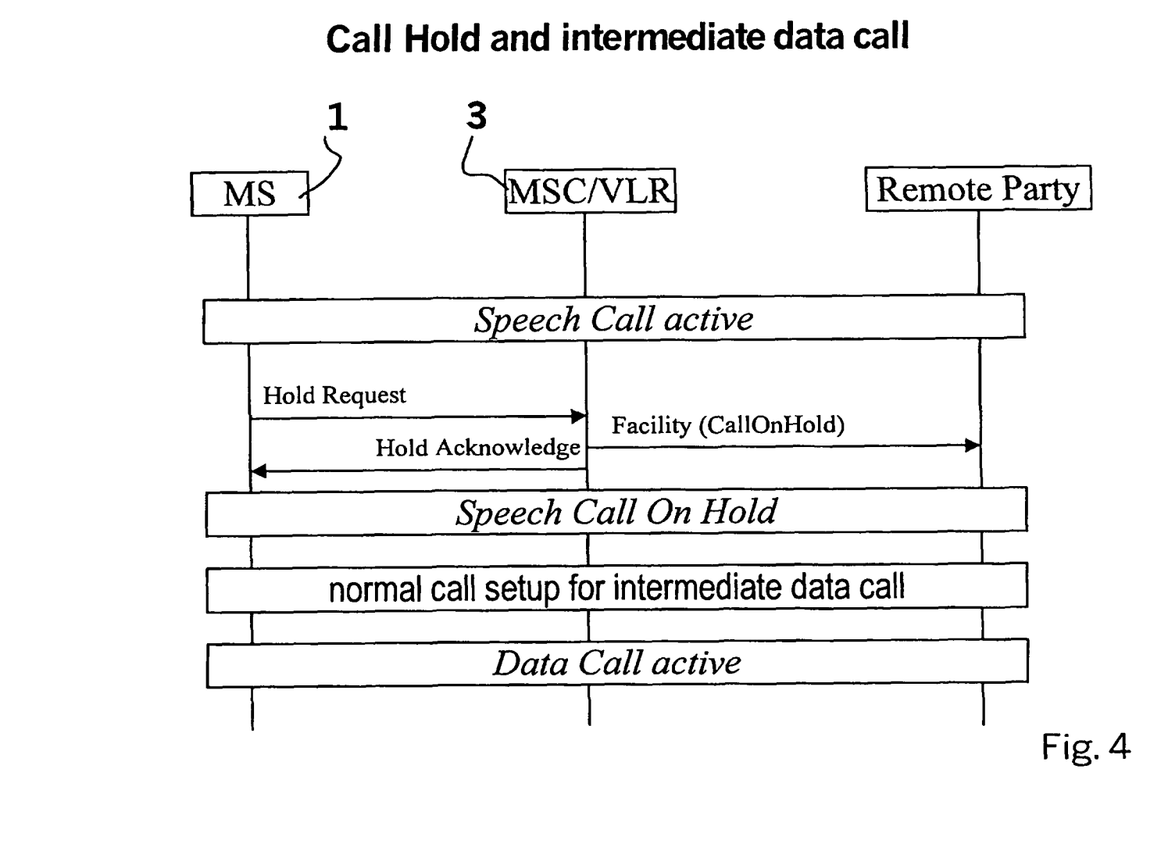

FIG. 4 illustrates a situation where only one bearer capability is provided during the setup of the first call. If a need for a second session arises, the active speech call is put on hold and an intermediate call session is taken. Supplementary services such as the Call Hold are another example where it may be necessary to change the channel configuration. The setup procedure for the intermediate or second call session may be similar to the setup procedure that has been accomplished for the first call.

Figure 5:
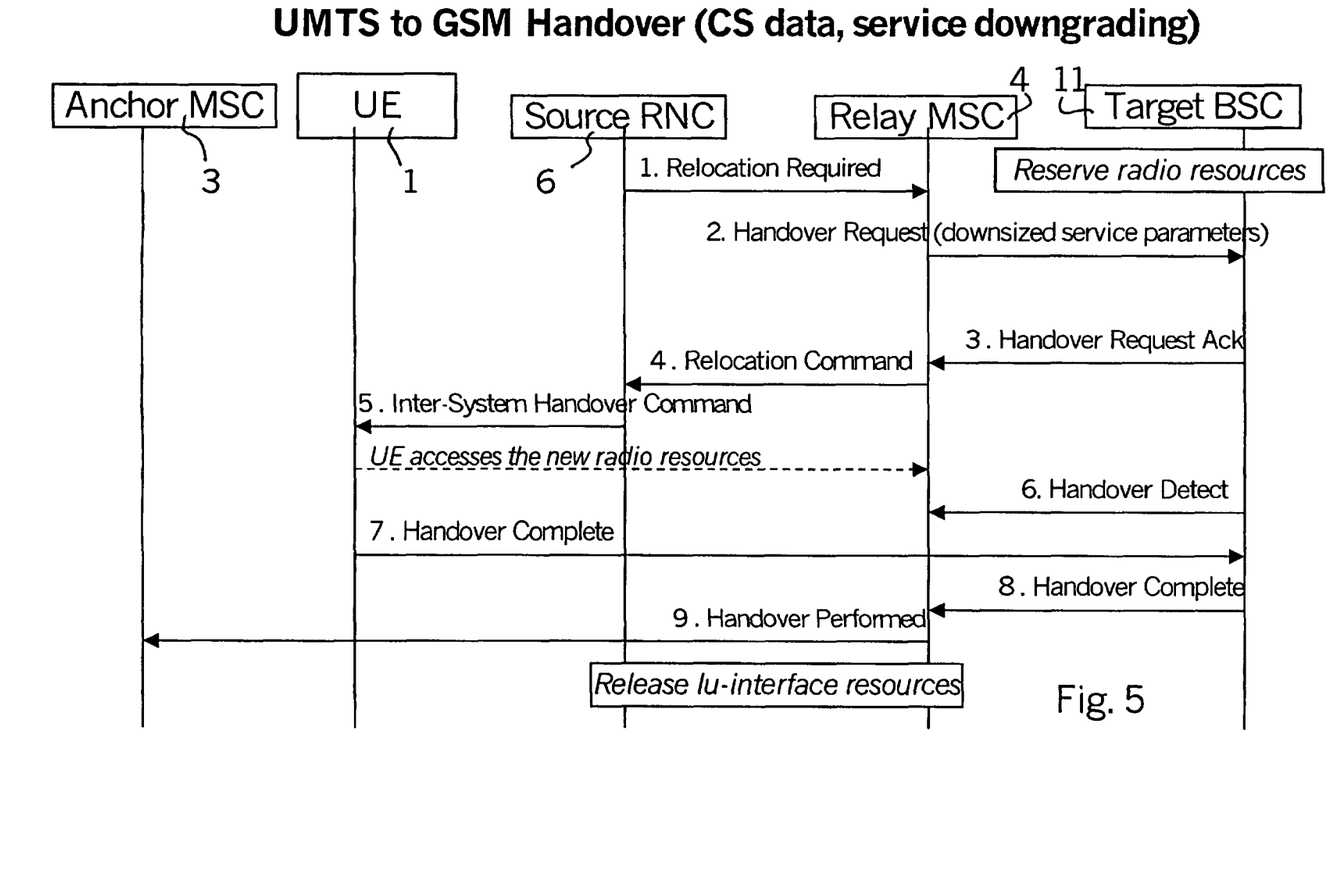

FIG. 5 illustrates a signalling during an intersystem handover (UMTS to GSM) procedure wherein the channel configuration is changed in the communication system of FIG. 2. This embodiment provides an interface that enables a change in the channel configuration by allocating a new channel after a UMTS to GSM handover.

More particularly, the source radio network controller 6 sends a relocation required message (1.) to the relay network control entity 4. The relay control entity 4 sends a handover request message (2.) to the target base station controller 11. The handover request message contains information regarding the channel type that should be used for the session.

In response to the request (2.), the base station controller 11 reserves required radio resources. The reservation of the radio channel is performed within the limitations set by said information of the channel type in the message (2.) from the relay control entity.

After the reservation of resources the base station controller 11 acknowledges (3.) the request for the handover. The acknowledgement message (3.) includes information regarding the chosen channel the base station controller selected for the session.

In response to the acknowledgement message (3.) the relay control entity 4 sends relocation command message (4.) to the source radio network controller 6. The radio network controller 6 may then signal an inter-system handover command (5.) to the user equipment 1.

The user equipment 1 is now enabled to access the new radio resources. The target base station controller 11 detects that the user equipment has accessed the new radio channel and sends a handover detect message (6.) to the relay control entity 4.

User equipment 1 may acknowledge (7.) to the base station controller 11 that the handover has been successfully completed. In response to this message the base station controller 11 may acknowledge (8.) the completion of the handover proceedings to the relay control entity 4.

Finally the relay control entity 4 confirms (9.) to the anchor control entity 3 that the handover has been performed. After this the Iu interface resources reserved by the handover proceedings can be released.

Figure 6:
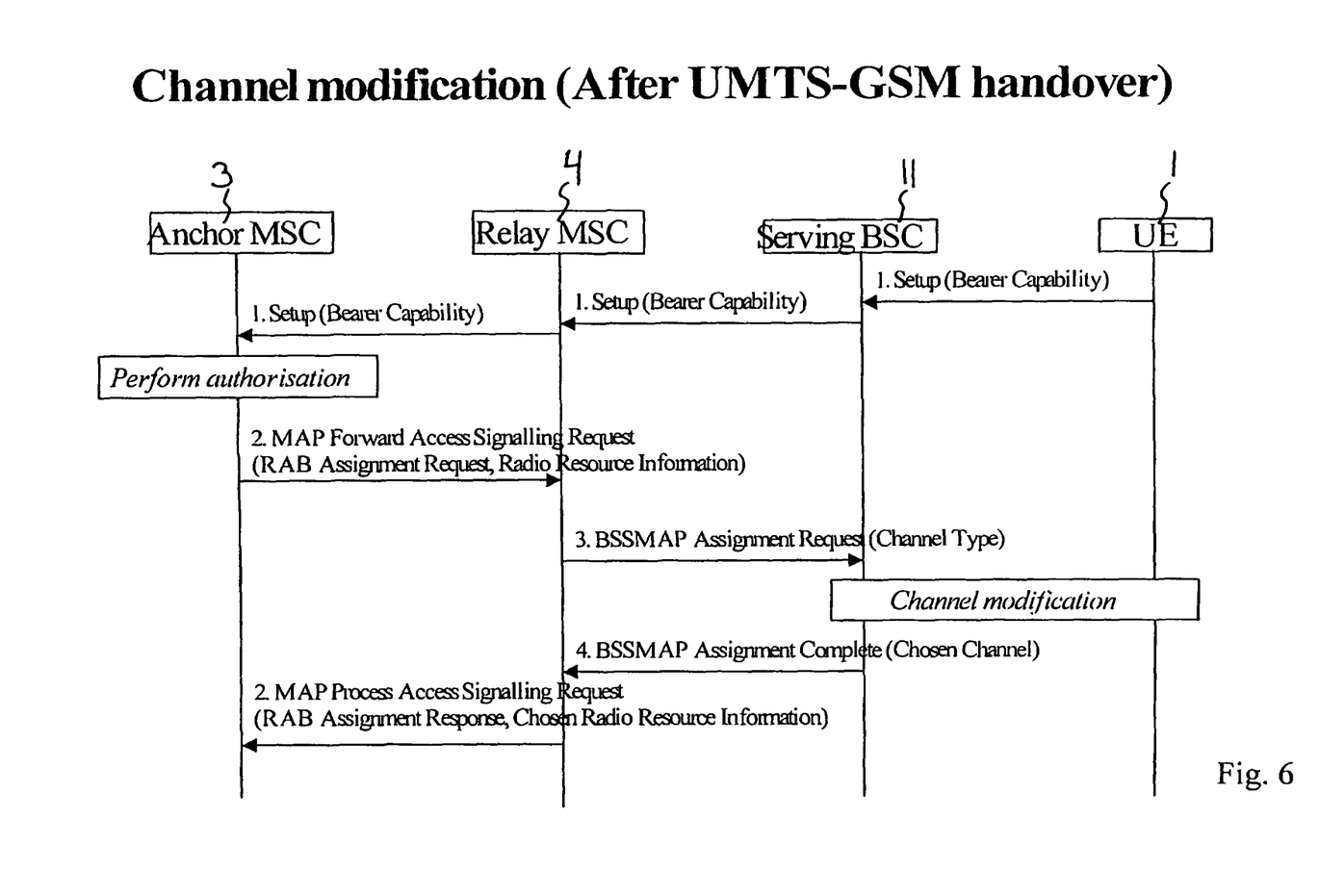
FIG. 6 is a signal diagram illustrating channel modification operation in accordance with an embodiment of the present invention.

FIG. 6 illustrates a possible signalling that may occur during a channel modification procedure. The user equipment 1 transmits a setup message (1.) including bearer capability information to the serving base station controller 11. The base station controller forwards the message to the relay control entity 4 that forwards it further to the anchor control entity 3. After authorisation procedures the anchor control entity 3 may signal a RANAP message 'RAB ASSIGNMENT REQUEST' in a MAP FORWARD ACCESS SIGNALLING Request to the relay control entity 4 (see also FIG. 2, message step 2). In response to this the relay control entity 4 sends the BSSMAP assignment request (3.) to the serving base station controller 11.

The base station controller then chooses the radio channel (s) and accomplishes the radio channel modification procedure. After this acknowledgement/completion message (4.) is signalled to the relay control entity 4. In response to receiving this the relay control entity 4 forwards the chosen channel information describing the characteristics of the selected radio channel(s) for the session to the anchor control entity 3. This is shown to be accomplished by means of a chosen radio resource information element encapsulated in a MAP PROCESS ACCESS SIGNALLING Request.

Figure 7:
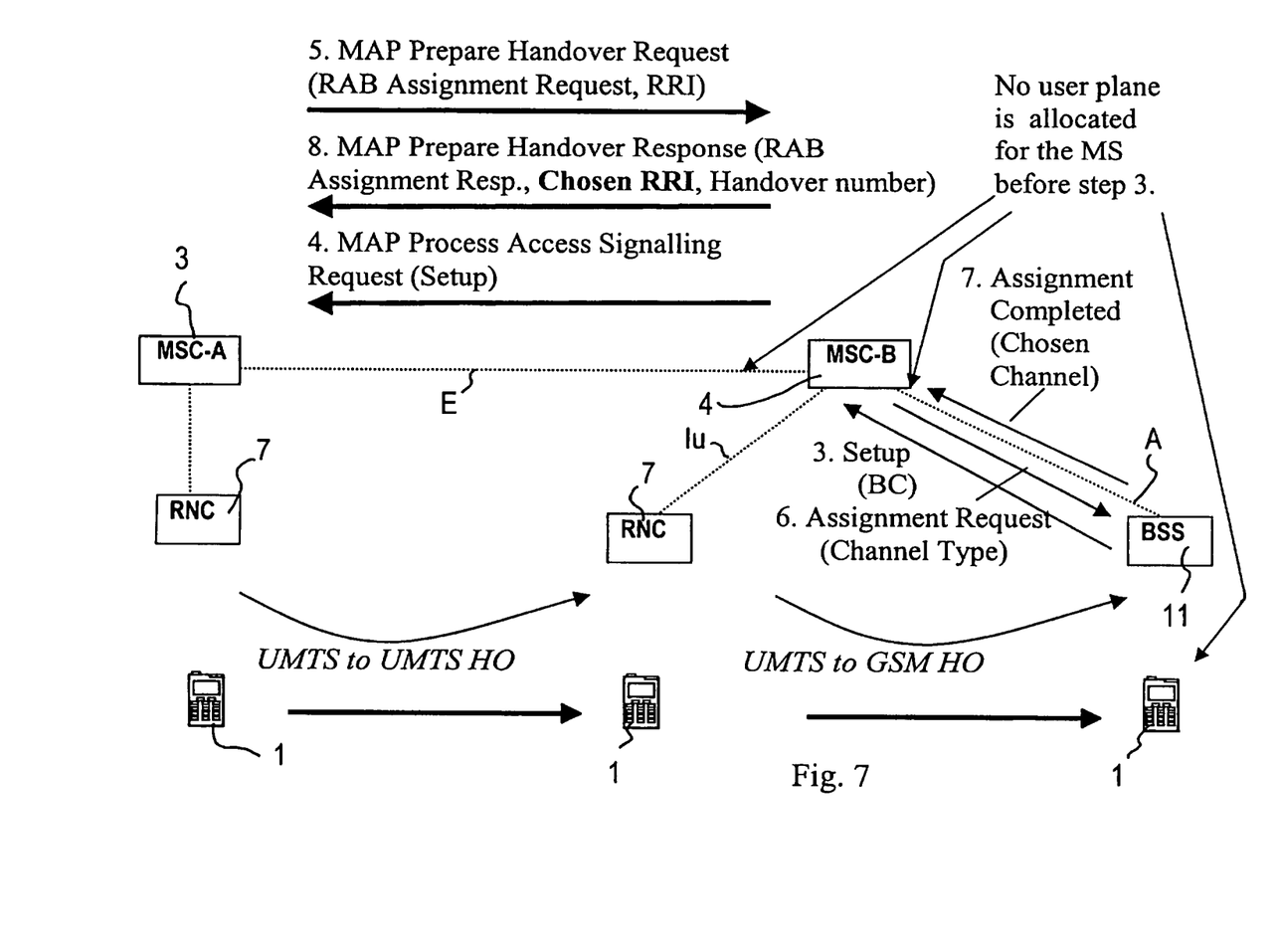
FIG. 7 illustrates a further embodiment.

FIG. 7 illustrates a situation where traffic channels are established for a mobile station 1 after a UMTS to GSM handover. This embodiment enables establishment of a user plane between the control entities 3 and 4 even in instances where the mobile station 1 does not have an active call session at the time the user wishes to establish a new session.

More particularly, in (1.) a UMTS to UMTS intrasystem (inter MSC) handover is accomplished. In (2.) a UMTS to GSM handover is accomplished. The user may or may not have an active bearer during these procedures. At the time of transmission of a setup message (3.) the user may be provided with a signalling connection over the radio (Iu and A) and E interfaces. However, any sessions such as speech calls have been released at this stage.

The user initiates a new session by sending the setup message (3.). The setup message includes a bearer capability (BC). After this the control entity 4 signals a MAP PROCESS ACCESS SIGNALLING Request (setup) message (4.) to the control entity 3.

The network initiates reservation of resources by a handover message (5.). In the particular example the message is a MAP Prepare Handover Request message. The message includes RAB assignment request and a radio resource information (RRI), as has been discussed above.

The control entity 4 reserves a handover number. The handover number will be signalled to the control entity 3 by a message (8.). The handover number is a known feature and will not be described in detail. It is sufficient to note that the handover number is needed by the control entities 3 and 4 in order to be able to establish a user plane bearer therebetween.

Assignment messages (6.) and (7.) may then be sent in accordance with a typical assignment procedure over the A interface.

After the assignment proceedings between the base station subsystem 11 and the network control entity 4 the entity 4 signals a handover response (8.) to the control entity 3. The message (8.) includes the handover number and also information associated with the chosen radio resource, e.g. the channel chosen by the base station subsystem 11. The handover response may also be a MAP message such as the Prepare handover Response message.

Based on the handover response the control entity 3 may establish a user plane between the control entities 3 and 4. The reason why it may be necessary to accomplish the handover in this kind of a situation based on e.g. MAP handover procedures is that the handover number cannot be reserved by means of a message such as the MAP FORWARD ACCESS SIGNALLING Request. The control entities 3 and 4 may not be able to establish the user plane therebetween without the handover number.

It should be appreciated that whilst embodiments of the present invention have been described in relation to mobile stations, embodiments of the present invention are applicable to any other suitable type of user equipment.

The operation of the various functions of the mobile station 1 may be controlled by an appropriate processor means. The user equipment 1 may have simultaneously a packet switched connection and a circuit switched connection which may both be handed over to the new radio station. The location of the mobile station 1 could be fixed (for example if it is providing radio communications for a fixed site) or the mobile station could be moveable (for example if it is a hand portable transceiver or "mobile phone").

The embodiment of the present invention has been described in the context of a communication system comprising GSM and UMTS mobile networks. It shall be appreciated that the invention is also applicable to any other communication system comprising a plurality of different networks wherein a similar problem may occur.

The communication system may provide circuit switched (CS) and/or packet switched (PS) services for user equipment. At least a part of the data communication may occur over the circuit switched service.

It shall also be appreciated that in the embodiments the change may be accomplished by modifying an existing session or establishing a new session. That is, the user may have one or more sessions. The modification may be applied to the first or any subsequent session. For example, if a data call session is to be modified the modification may be related to the channel configuration of the first session. If a user initially established a speech call (session 1) and later put the speech call on hold and established a data call (session 2). The second session may use e.g. the same terrestrial resources as the first session and "the same" but modified radio bearer.

The embodiments enable transferring of channel information that associates with other radio technologies over an interface between core network and access network control entities. It shall be appreciated that the embodiments have been discussed with reference to an interface between network control entities such as between two mobile switching centers. Embodiments of the present invention can be applicable to other network elements where applicable.

It is also noted herein that while the above describes examples as how to implement the invention, there are several variations and modifications which may be made to the disclosed solution without departing from the scope of the present invention as defined in the appended claims.

The invention claimed is:

1. A method comprising:

providing a first type of communication services for a station, wherein a first network entity is configured to provide control operations for the provision of said communication services in a first radio access system;

relaying a part of said control operations from the first network entity to a second network entity, wherein the second network entity is configured to provide control operations for provision of communication services in a second radio access system, the first and second radio access systems providing said first type of communication services;

exchanging between the first and second network entities information that associates with the provision of a second type of communication services during intrasystem handover for the first type of communication services, wherein the second network entity is also configured for provision of control operations for provision of communication services in a third radio access system and wherein said information comprises channel type parameters for the second type of communication services; and providing, based on said information, said second type of communication services for the station in the third radio access system.

2. A method as claimed in claim 1, comprising:

establishing a first session based on said first type communication service;

putting the first session on hold; and establishing a second session by modifying the communication service of the first session into conformity with said second type of communication services.

3. A method as claimed in claim 1, wherein configuration of the communication channel resources of a session provided by the first or second type communication services is changed.

4. A method as claimed in claim 1, wherein said information associates with characteristics that are required for the second type of communication services.

5. A method as claimed in claim 4, wherein the required characteristics are indicated by a parameter describing a channel type.

6. A method as claimed in claim 1, wherein the second network entity provides a control entity of a radio access system with information that associates with the second type of communication services.

7. A method as claimed in claim 6, wherein said control entity provides radio channel resources based on the information received from the second network entity.

8. A method as claimed in claim 7, wherein said control entity determines the radio channel resources that are used for the provision of the second type of communication services.

9. A method as claimed in claim 6, wherein said control entity signals to a network entity information of radio channel resources it decided to use for the provision of the second type of communication services.

10. A method as claimed in claim 9, wherein said information is signalled to the second network entity and forwarded from the second network entity to the first network entity.

11. A method as claimed in claim 1, wherein information associated with the provision of communication services is carried by a message that is based on a protocol such as the mobile application part (MAP).

12. A method as claimed in claim 1, wherein said information associated with the provision of communication services is carried in a message that does not directly associate with handover procedures.

13. A method as claimed in claim 11, wherein said information is carried by messages such as a forward access signalling request or a process access signalling request of the mobile application part protocol.

14. A method as claimed in claim 1, wherein a first session is provided for the station based on a first bearer capability indication from the station and a second session is provided for the station based on a second bearer capability indication from the station.

15. A method as claimed in claim 1, wherein a session is provided for the station based on at least two bearer capability indications form the station.

16. A method as claimed in claim 1, wherein an information element including information regarding said second type of communication channel resources is embedded in a radio access network application part (RANAP) message signalled between the first and second network entities.

17. A method as claimed in claim 1, wherein the second type of communication services are provided for an intermediate communication service requested by the station.

18. A method as claimed in claim 1, wherein at least one type of the communication services is provided based on a third generation communication service.

19. A method as claimed in claim 18, wherein the communication services are provided based on a universal mobile telecommunications service (UMTS).

20. A method as claimed in claim 1, wherein at least one type of the communication services is provided based on a global system for mobile communications (GSM).

21. A system comprising:
first and second communication units configured to provide a first type of bearers for a station;
a third communication unit configured to provide a second type of bearers for the station;
a first network entity configured to control the first communication unit;
a second network entity configured to control the second and third communication units, wherein a part of the control functions by the first network entity that associate with the provision of the first type of bearers can be relayed to the second network entity; and
an interface, between the first and second entities, configured to exchange, during intrasystem handover for the first type of bearers, information that associates with provision of the second type of bearers for the station, wherein said information comprises channel type parameters for the second type of communication services and the third communication unit is configured to provide said second type of bearers for the station based on said information.

22. An apparatus comprising:
a provider configured to provide a first type of communication services for a station, wherein a first network entity is configured to provide control operations for the provision of said communication services in a first radio access system;
a relaying unit configured to relay a part of said control operations from the first network entity to a second network entity, wherein the second network entity is configured to provide control operations for provision of communication services in a second radio access system, the first and second radio access systems providing said first type of communication services;
an exchanging unit configured to exchange, between the first and second network entities, information that associates with the provision of a second type of communication services during intrasystem handover for the first type of communication services, wherein the second network entity is also configured for provision of control operations for provision of communication services in a third radio access system and wherein said information comprises channel type parameters for the second type of communication services; and
a provider configured to provide, based on said information, said second type of communication services for the station in the third radio access system.

23. The apparatus as claimed in claim 22, comprising:
an establisher configured to establish a first session based on said first type communication service;
a holder configured to place the first session on hold; and
an establisher configured to establish a second session by modifying the communication service of the first session into conformity with said second type of communication services.

24. The apparatus as claimed in claim 22, wherein configuration of the communication channel resources of a session provided by the first or second type communication services is changed.

25. The apparatus as claimed in claim 22, wherein said information associates with characteristics that are required for the second type of communication services.

26. The apparatus as claimed in claim 25, wherein the required characteristics are indicated by a parameter describing a channel type.

27. The apparatus as claimed in claim 22, wherein information associated with the provision of communication services is carried by a message that is based on a protocol such as the mobile application part (MAP).

28. The apparatus as claimed in claim 22, wherein said information associated with the provision of communication services is carried in a message that does not directly associate with handover procedures.

29. The apparatus as claimed in claim 27, wherein said information is carried by messages such as a forward access signalling request or a process access signalling request of the mobile application part protocol.

30. The apparatus as claimed in claim 22, wherein a first session is provided for the station based on a first bearer capability indication from the station and a second session is provided for the station based on a second bearer capability indication from the station.

31. The apparatus as claimed in claim 22, wherein a session is provided for the station based on at least two bearer capability indications form the station.

32. The apparatus as claimed in claim 22, wherein an information element including information regarding said second type of communication channel resources is embedded in a radio access network application part (RANAP) message signalled between the first and second network entities.

33. The apparatus as claimed in claim 22, wherein the second type of communication services are provided for an intermediate communication service requested by the station.

34. The apparatus as claimed in claim 22, wherein at least one type of the communication services is provided based on a third generation communication service.

35. The apparatus as claimed in claim 34, wherein the communication services are provided based on a universal mobile telecommunications service (UMTS).

36. The apparatus as claimed in claim 22, wherein at least one type of the communication services is provided based on a global system for mobile communications (GSM).

37. An apparatus comprising:

providing means for providing a first type of communication services for a station, wherein a first network entity is configured to provide control operations for the provision of said communication services in a first radio access system;

relaying means for relaying a part of said control operations from the first network entity to a second network entity, wherein the second network entity is configured to provide control operations for provision of communication services in a second radio access system, the first and second radio access systems providing said first type of communication services;

exchanging means for exchanging, between the first and second network entities, information that associates with the provision of a second type of communication services during intrasystem handover for the first type of communication services, wherein the second network entity is also configured for provision of control operations for provision of communication services in a third radio access system and wherein said information comprises channel type parameters for the second type of communication services; and providing means for providing, based on said information, said second type of communication services for the station in the third radio access system.

* * * * *